US010254123B2

(12) United States Patent
Vandanapu et al.

(10) Patent No.: US 10,254,123 B2
(45) Date of Patent: Apr. 9, 2019

(54) NAVIGATION SYSTEM WITH VISION AUGMENTATION MECHANISM AND METHOD OF OPERATION THEREOF

(71) Applicant: Telenav, Inc., Santa Clara, CA (US)

(72) Inventors: Naveen Kumar Vandanapu, San Jose, CA (US); Gregory Stewart Aist, Santa Clara, CA (US); Aliasgar Mumtaz Husain, Milpitas, CA (US); Casey Carter, Sunnyvale, CA (US); Shalu Grover, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 156 days.

(21) Appl. No.: 15/163,342

(22) Filed: May 24, 2016

(65) Prior Publication Data

US 2017/0343372 A1 Nov. 30, 2017

(51) Int. Cl.
| | |
|---|---|
| *G01C 21/36* | (2006.01) |
| *H04N 7/18* | (2006.01) |
| *G06F 3/048* | (2013.01) |
| *G06F 3/01* | (2006.01) |
| *G06F 3/0484* | (2013.01) |

(52) U.S. Cl.
CPC ......... *G01C 21/3602* (2013.01); *G06F 3/012* (2013.01); *G06F 3/013* (2013.01); *G06F 3/0484* (2013.01); *H04N 7/183* (2013.01); *G06F 2203/0381* (2013.01)

(58) Field of Classification Search
None
See application file for complete search history.

(56) References Cited

U.S. PATENT DOCUMENTS

| | | | |
|---|---|---|---|
| 9,182,243 B2 | 11/2015 | van Os et al. | |
| 9,218,535 B2 | 12/2015 | Wey et al. | |
| 2005/0134479 A1 | 6/2005 | Isaji et al. | |
| 2012/0046855 A1* | 2/2012 | Wey | G08G 1/09623 701/117 |
| 2014/0379485 A1* | 12/2014 | Goswami | G06Q 30/0269 705/14.66 |

* cited by examiner

*Primary Examiner* — Abby Y Lin
*Assistant Examiner* — Kyung J Kim
(74) *Attorney, Agent, or Firm* — Perspectives Law Group, Corp.

(57) ABSTRACT

A method of operation of a navigation system includes: determining a user orientation for representing a system user; capturing an external image based on the user orientation; determining with a control circuit a sign-content estimate from the external image based on the user orientation; and communicating an augmented output for representing a physical sign captured in the external image.

20 Claims, 5 Drawing Sheets

NAVIGATION SYSTEM WITH VISION AUGMENTATION MECHANISM AND METHOD OF OPERATION THEREOF

TECHNICAL FIELD

An embodiment of the present invention relates generally to a navigation system, and more particularly to a system with a vision augmentation mechanism.

BACKGROUND ART

Modern consumer and industrial electronics, especially devices such as graphical computing systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is navigation functions for devices. However, in the midst of increase in information readily available to the user, balancing variety of features with user's familiarity of the geographic area has yet been fully utilized.

Thus, a need still remains for a navigation system with a vision augmentation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: determining a user orientation for representing a system user; capturing an external image based on the user orientation; determining with a control circuit a sign-content estimate from the external image based on the user orientation; and communicating an augmented output for representing a physical sign captured in the external image.

An embodiment of the present invention provides a navigation system, including: a control circuit configured to: determine a user orientation for representing a system user, capture an external image based on the user orientation, determine a sign-content estimate from the external image based on the user orientation, and an interface, coupled to the control circuit, configured to communicate an augmented output for representing a physical sign captured in the external image.

An embodiment of the present invention provides a non-transitory computer readable medium including instructions for a navigation system, including: determining a user orientation for representing a system user; capturing an external image based on the user orientation; determining a sign-content estimate from the external image based on the user orientation; and communicating an augmented output for representing a physical sign captured in the external image.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
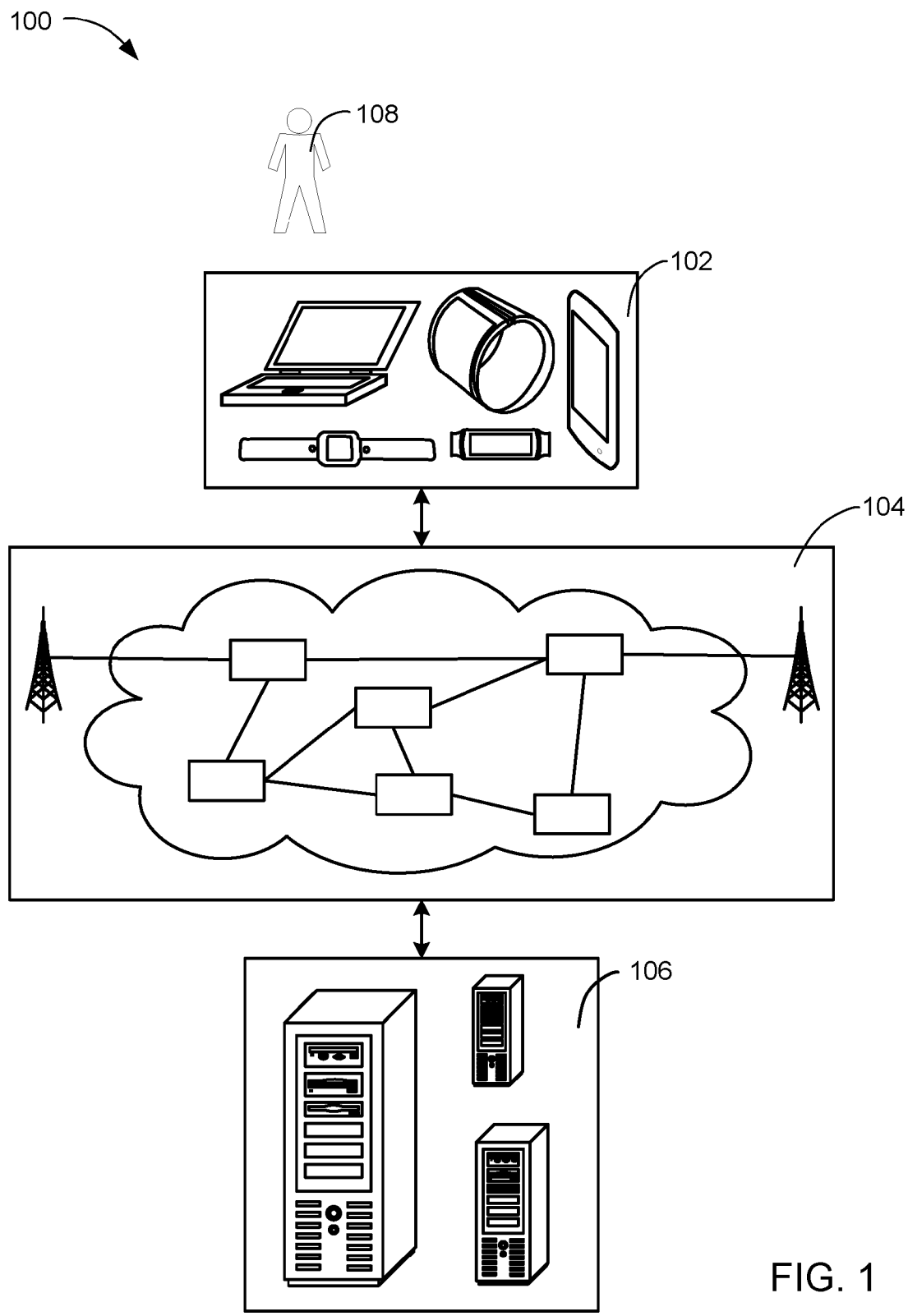
FIG. 1 is a navigation system with a vision augmentation mechanism in an embodiment of the present invention.

The following embodiments can be for communicating augmented output for a system user, such as during operation or control of a vehicle. The augmented output can be for communicating visual information captured through sign-content estimate for a map entity matching a user orientation. The user orientation can be used to process a target image vector in determining a target estimate as the map entity currently being viewed by the system user or in-line with line-of-sight of the system user. The augmented output can aide the system user view locations or information difficult to view or hidden from perspective of the system user during movement or operation of the vehicle.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as or include software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof to control one or more of the hardware units or circuits.

Referring now to FIG. 1, therein is shown a navigation system 100 with a vision augmentation mechanism in an embodiment of the present invention. The navigation system 100 can include a first device 102, such as a client or a server, connected to a second device 106, such as a client or server.

The navigation system 100 can include a system for searching or providing guidance or information associated with geographic locations, a regulatory system for enabling access to a device or a vehicle, or a combination thereof. The first device 102 can communicate with the second device 106 with a network 104, such as a wireless or wired network.

For example, the first device 102 can be of any of a variety of computing devices, such as a cellular phone, personal digital assistant, a notebook computer, a wearable device, internet of things (IoT) device, automotive telematics navigation system, or other multi-functional mobile communication or entertainment device. Also for example, the first device 102 can include a device or a sub-system.

The first device 102 can couple, either directly or indirectly, to the network 104 to communicate with the second device 106 or can be a stand-alone device. The first device 102 can further be separate form or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices, or video transmission devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, a wearable device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can be used by or interact with a system user 108. The system user 108 can include a person or an entity accessing or utilizing the navigation system 100 or a device therein. For example, the system user 108 can include a person owning or operating the first device 102. Also for example, the system user 108 can access or utilize the second device 106 through the first device 102.

Figure 2:
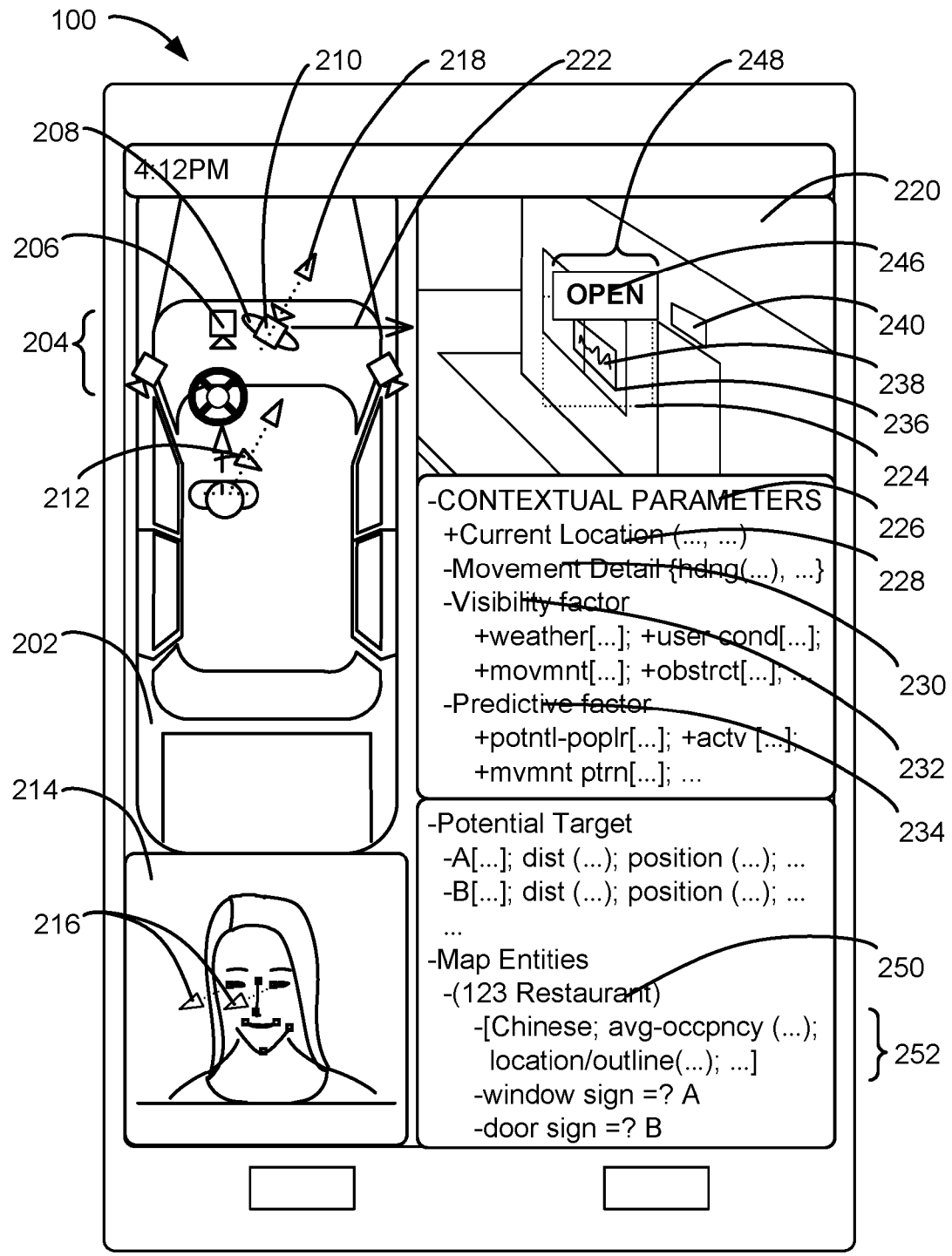
FIG. 2 is an example of a display interface of the navigation system.

Referring now to FIG. 2, therein is shown an example of a display interface of the navigation system 100. The navigation system 100 can provide information regarding or augmentations for environment surrounding the system user 108 of FIG. 1. The navigation system 100 can provide the information or the augmentations audibly or visually, such as through the display interface.

The navigation system 100 can provide the information or the augmentations for items of interest to the system user 108. The navigation system 100 can detect or estimate one or more items that the system user 108 is trying to view and provide the information or the augmentations for such item. For example, the navigation system 100 can display the information or the augmentations for a sign outside of a vehicle 202 transporting the system user 108 or being operated by the system user 108.

The navigation system 100 can display a representation of the vehicle 202, such as for status information. The navigation system 100 can further include an image capturing circuit 204 represented in reference to the vehicle 202, the system user 108, or a combination thereof.

The image capturing circuit 204 is a device or a portion therein configured to capture visual information. The image capturing circuit 204 can include a camera, a camcorder, a recorder, or a combination thereof for capturing the visual information as an image or a sequence of images.

For example, the image capturing circuit 204 can include a front-facing camera, a back-facing camera, or a combination thereof included in or integral with the first device 102 of FIG. 1 including a mobile consumer device such as a tablet or a mobile phone. Also for example, the image capturing circuit 204 can include one or more cameras included in or integral with one or more instances of the vehicle 202 including the first device 102 therein. Also for example, the image capturing circuit 204 can include the devices, portions therein or a combination thereof exemplified above.

The image capturing circuit 204 can include an internal capturing circuit 206, an external capturing circuit 208, or a combination thereof. The internal capturing circuit 206 is the image capturing circuit 204 configured or designated to capture or process visual information or images inside of the vehicle 202, such as for a cabin, a cockpit, or a combination thereof.

The external capturing circuit 208 is the image capturing circuit 204 configured or designated to capture or process visual information or images outside of the vehicle 202 or the outer boundaries or perimeters thereof. For example, the external capturing circuit 208 can include front-facing cameras, back-up cameras, adjacent-lane detectors or cameras, cameras directed or oriented away from a travel direction of the vehicle 202.

The internal capturing circuit 206 and the external capturing circuit 208 can be determined from the perspective of the vehicle 202 including or carrying the system user 108. For example, the front-facing camera of the mobile phone belonging to the system user 108 can be determined or identified as either the external capturing circuit 208 or the internal capturing circuit 206 based on physical location or orientation of the mobile phone.

The image capturing circuit 204 can further include or be coupled to an alignment circuit 210. The alignment circuit 210 is a device or a portion thereof configured to physically control or change location or orientation of the image capturing circuit 204. The alignment circuit 210 can be used to direct or point the image capturing circuit 204 to capture visual information originating from a physical location correlated with the location or alignment, or to capture the image of the correlated physical location.

The navigation system 100 can process user cue 212 in association with the image capturing circuit 204. The user cue 212 can include data or information representing a physical location or movement of the system user 108 or the user's body parts. The user cue 212 can include an event, an action, a sound, or a combination thereof generated or provided by the system user 108. The user cue 212 can be processed as commands or control information for the image capturing circuit 204 or processes subsequent to the results from the image capturing circuit 204.

For example, the user cue 212 can include representations of an eye position or movement, a facial orientation, a facial expression, or a combination thereof. Also for example, the user cue 212 can include representations of a shape, a position, a movement, or a combination thereof for user's extremities, such as the user's arm, leg, hand, foot, head, or a combination thereof. Also for example, the user cue 212 can include positions, movements, orientations, shapes, or a combination thereof of one body part relative to another, such as relative to the user's torso or face. Also for example, the user cue 212 can include sounds or verbal information generated by the system user 108.

The navigation system 100 can process the user cue 212 based on a user image 214. The user image 214 can include visual information of the system user 108 captured or detected by the image capturing circuit 204. The user image 214 can be captured or generated by the internal capturing circuit 206. The user image 214 can include one or more static images, a continuous video clip, or a combination thereof including visual representation of the system user 108 or capturing the visual information of the system user 108.

The navigation system 100 can process the user image 214 to detect or identify the user cue 212. The navigation system 100 can further process the user image 214 to determine user orientation 216. The user orientation 216 is a representation of a direction indicated by the system user 108 in the user image 214. The user orientation 216 can include a direction determined, such as by calculation or estimation, by the navigation system 100 based on physical position, orientation, action, movement, or a combination of the system user 108 or one or more of the user's body parts.

For example, the user orientation 216 can include the direction the system user 108 is facing, looking, pointing, or a combination thereof. As a more specific example, the user orientation 216 can include the direction determined based on position, movement, orientation, or a combination thereof of the user's eye, face, arm, hand, finger, or a combination thereof. Also as a more specific example, the user orientation 216 can include the direction determined based on position, movement, orientation, or a combination thereof of the system user 108 or the user's body part relative to another body part, a reference point, such as a location inside or outside of the vehicle 202.

The navigation system 100 can further process a target image vector 218. The target image vector 218 is a representation of a direction in physical or geographical space indicated by the system user 108. The target image vector 218 can be calculated, estimated, or generated based on the user orientation 216 along with the image capturing circuit 204, a position thereof, a direction thereof, an orientation thereof, a relative relationship with the user orientation 216, or a combination thereof.

The target image vector 218 can include the direction according to a coordinate system or a reference point in the physical or geographical space. In comparison, the user orientation 216 can be information or direction relative to the user image 214, the image capturing circuit 204, the alignment circuit 210, an orientation or a direction thereof, or a combination thereof.

The navigation system 100 can process the user image 214, the user cue 212, the user orientation 216, the target image vector 218, or a combination thereof based on physical indicators or markers predetermined by and stored in the navigation system 100. Details regarding the user image 214, the user cue 212, and the user orientation 216 are discussed below.

The target image vector 218 can further include or correspond to an external image 220 or a specific portion therein. The external image 220 can include can include visual information of the environment surrounding the vehicle 202 or the system user 108. The external image 220 can be captured or generated by the external capturing circuit 208. The external image 220 can include one or more static images, a continuous video clip, or a combination thereof including visual representation of the environment surrounding the system user 108 or the vehicle 202 or capturing the visual information of the environment.

The external image 220 can include a directed image 222, a vector correlation zone 224, or a combination thereof. The directed image 222 can include the external image 220 captured or generated based on the target image vector 218. The directed image 222 can include the external image 220 captured or generated based on the external capturing circuit 208 positioned or oriented based on the target image vector 218. For example, the directed image can include the external image 220 captured or generated using the external capturing circuit 208 specifically positioned or oriented with the alignment circuit 210 at a position, orientation, or direction associated with the target image vector 218.

The vector correlation zone 224 is a portion within the external image 220 corresponding to the target image vector 218. The vector correlation zone 224 can be a specific portion of the directed image 222 further estimating or representing a geographic location or area corresponding to the user orientation 216. The vector correlation zone 224 can include the specific portion of the directed image 222 taken based on the target image vector 218. The vector correlation zone 224 can further include the specific portion of the external image 220 taken or captured using a general or generically positioned or physically fixed instance of the external capturing circuit 208.

The navigation system 100 can further process contextual parameters 226. The contextual parameters 226 can include representations of a situation, an environment, a purpose, a significance, a condition or status, or a combination thereof regarding the system user 108, geographical movement or travel thereof, a device controlled or owned by the system user 108, or a combination thereof.

The contextual parameters 226 can include information detectable or available to one or more devices in the navigation system 100 indicative or characteristic of the situation, the environment, the purpose, the significance, the condition or status, or a combination thereof. For example, the contextual parameters 226 can include information stored or accessible in the user's schedule calendar, the electronic communication data or communication records, the social media account or database, or a combination thereof.

Also for example, the contextual parameters 226 can include information regarding other end-users connected or associated with the system user 108, such as through previous communication, detectable relationship or connection, physical proximity of their corresponding devices, or a combination thereof. Also for example, the contextual parameters 226 can include a current location 228, a movement detail 230, a visibility factor 232, a predictive factor, or a combination thereof.

The current location 228 represents the geographical location of the system user 108 at a current time. The current location 228 can identify the physical or geographical location of the first device 102 associated with, carried by, owned by, or a combination thereof in connection with the system user 108. The current location 228 can include the location information, such as GPS or other coordinates representing the current geographical location. The navigation system 100 can store and track the current location 228 associated with the current time to track and record locations or movements of the system user 108.

The movement detail 230 can include information representing displacement or movement of the system user 108 at the current time. The movement detail 230 can include information characterizing the current travel. For example, the movement detail 230 can include a user velocity, a user acceleration, a user travel-direction, or a combination thereof.

The movement detail 230 can be related to the user orientation 216, such as for directional components. For example, the user orientation 216 or the target image vector 218 can align with the travel direction of the movement detail 230 for majority of the situations where the system user 108 is driving or operating the vehicle 202. The user orientation 216 or the target image vector 218 can be different from the travel direction when the system user 108 is looking at a geographic location, such as for a sign or a POI, along a side of the road or at the first device 102.

The visibility factor 232 is information representing influences affecting ability of the system user 108 to visually observe and process information outside of the vehicle 202. The visibility factor 232 can include an external condition, a user condition, the movement detail 230, or a combination thereof.

For example, the visibility factor 232 can include the external condition representing brightness or visibility according to a weather condition, the current time, or a combination thereof. Also for example, the visibility factor 232 can include the user condition representing user's visual acuity or medical condition. Also for example, the visibility factor 232 can be affected by or adjusted based on the movement detail 230, such as according to the travel speed or travel direction.

The visibility factor 232 can further include obstruction information. The obstruction information can be historical or crowd-sourced information. For example, the obstruction information can include a number or a rate of clarification or repeat requests for POI locations, street identification, or a combination thereof exceeding a threshold predefined by the navigation system 100 at or regarding a particular location.

Also for example, the obstruction information can include review or feedback information, service requests, warnings, status information, or a combination thereof provided by multiple end-users, by the maintenance authority, or a combination thereof. Also for example, the visibility factor 232 can utilize a combination of the factors exemplified above.

The predictive factor 234 is information representing indicators regarding the user cue 212 or the target image vector 218. The predictive factor 234 can include processing results of the navigation system 100 for estimating or anticipating the user cue 212 to process the external image 220, for determining a target estimate 236 as an estimation or prediction of a specific object or entity in the external image 220 sought by the system user 108, or a combination thereof. For example, the predictive factor 234 can include a maneuver relative location, a popularity rating, a speed deviation, an activity estimation, or a combination thereof.

The maneuver relative location can include a geographic location corresponding to one or more physical maneuvers of the vehicle 202. The maneuver relative location can include a node joining different paths or segments, a location on corresponding path or segment preceding the node along the travel direction, or a combination thereof. For example, the maneuver relative location can include intersections, exits or entrances, a location preceding thereof, or a combination thereof.

The popularity rating can include a representation of attractiveness or fame associated with a geographic location, an entity, an establishment, or a combination thereof. The popularity rating can include feedback information from multiple users for the corresponding location or entity, such as crowd-sourced or establishment-provided information including reviews, a number of occupancy or patronage, or a combination thereof. The navigation system 100 can utilize the predictive factor 234 including the popularity rating to process a likelihood that the user is looking for the corresponding location or entity.

The speed deviation can include information regarding the current speed of the system user 108. The speed deviation can include indication of the current speed in relation to average speed of other users at the same geographic location. The speed deviation can further include indication of change in the current speed. The speed deviation can be based on the movement detail 230. For example, the speed deviation can represent the system user 108 slowing down or travelling slower to look for a particular location or specific visual information.

The activity estimation can include a representation of a current action or an upcoming event associated with the current action. The activity estimation can be processed based on incoming or detected information or other instances of the contextual parameters 226. The activity estimation can include a prediction of the user's current activity, which can further indicate the user cue 212 or the target estimate 236 based on a link or a relationship with the user's current activity.

The target estimate 236 is a representation of the real-world object existing in the environment surrounding the system user 108 and likely sought by the system user 108. The target estimate 236 can be an estimation or prediction of a specific object or entity represented or captured in the external image 220 sought by the system user 108. The target estimate 236 can correspond to a specific portion within the external image, an object or a geographic location represented in the specific portion, or a combination thereof.

For example, the target estimate 236 can correspond to or represent a physical sign 238 existing in the environment outside of the vehicle 202. As a more specific example, the target estimate 236 can correspond to or represent a physical sign 238 can including a street name sign, a traffic sign, an address indicator, a landmark, a business sign, an open or closed sign, operating hours, a logo, or a combination thereof. Also for example, the target estimate 236 can correspond to or represent any item, location, or thing included in map data that can be perceived by the system user 108.

Also for example, the target estimate 236 can be based on an image-address indicator 240. The image-address indicator 240 is a portion in the external image 220 corresponding to the physical sign 238 communicating street address of a building or structure in the real-world. The image-address indicator 240 can be a sequence of numbers or characters on or about the building or structure, on the street or sidewalk near or abutting the building or structure, on a mailbox within a proximity or geographic relationship to the building or structure, or a combination thereof.

The target estimate 236 can be determined based on recognizing a potential target, analyzing the potential target, validating the potential target, or a combination thereof. For example, the target estimate 236 can be based on recognizing the potential target from or included in the external image 220 using a target recognition template. Also for example, the target estimate 236 can be based on analyzing the potential target using a relative distance, a relative position, or a combination thereof.

The target recognition template can include shapes, sizes or dimensions, orientations, colors, a limit or a range thereof, markers or indicators, relative locations of markers or indicators, or a combination thereof for defining or recognizing possible or known visual representations of the target estimate 236. For example, the target recognition template can include shapes, sizes or dimensions, orientations, colors, a limit or a range thereof, or a combination thereof for defining or recognizing possible or known instances of the physical sign 238.

The relative distance can be a representation of geographic separation between the system user 108 or the vehicle 202 and the potential target. The relative distance can be measured in a direct line representing line-of-sight.

The relative position can be a representation of a physical arrangement or relationship in the geographic locations between the system user 108 or the vehicle 202 and the potential target. The relative position can be represented using an angle, a direction vector, or a combination thereof. The relative position can further be based on or related to the user orientation 216, the travel direction of the movement detail 230, road shape or direction, or a combination thereof.

The navigation system 100 can analyze the potential target based on the relative position, the relative distance, the target image vector 218, the user orientation 216, or a combination thereof to determine the target estimate 236. The navigation system 100 can determine the target estimate 236 as the instance of the potential target matching one or more conditions, thresholds, situations, or a combination thereof. Details regarding the determination of the target estimate 236 are discussed below.

The navigation system 100 can process the target estimate 236 to determine a sign-content estimate 246. The navigation system 100 can further generate and communicate an augmented output 248 based on the sign-content estimate 246, the target estimate 236, or a combination thereof.

The sign-content estimate 246 is an approximation or a replication of information or knowledge contained in the physical sign 238 corresponding to the target estimate 236. The sign-content estimate 246 can include an estimate of the information or the message intended for communication through the corresponding instance of the physical sign 238. The navigation system 100 can determine the sign-content estimate 246 using a variety of recognition methods or processes focused on the target estimate 236, the vector correlation zone 224 of the external image 220, corresponding information in the map data, or a combination thereof.

The augmented output 248 is communication of the sign-content estimate 246 intended for the system user 108. The navigation system 100 can use the augmented output 248 to communicate the sign-content estimate 246 to the system user 108. The augmented output 248 can include visual or audible information, including digital representation or implementations thereof, for communicating the sign-content estimate 246.

The navigation system 100 can further use the target estimate 236, the sign-content estimate 246, or a combination thereof to update or maintain information regarding a map entity 250. The map entity 250 can include an object within the map having significance, such as for a location, a group, a structure, a POI, or a combination thereof.

The navigation system 100 can further include or access map-entity detail 252 for the map entity 250. The map-entity detail 252 represents descriptions regarding the map entity 250. For example, the map-entity detail 252 can include a street address, a coordinate, or a combination thereof. Also for example, the map-entity detail 252 can represent operating hours, business name, or a combination thereof.

The navigation system 100 can update and manage the map-entity detail 252 based on the target estimate 236, the sign-content estimate 246, or a combination thereof. For example, the navigation system 100 can update or verify the street address based on the image-address indicator 240 or the sign-content estimate 246 thereof. Also for example, the navigation system 100 can update or verify the operating hours for the sign-content estimate 246 of the target estimate 236 corresponding to the physical sign 238 corresponding to open signs or operating hours. Also for example, the navigation system 100 can similarly update or verify business names from the physical sign 238 corresponding to the name of the business.

Figure 3:
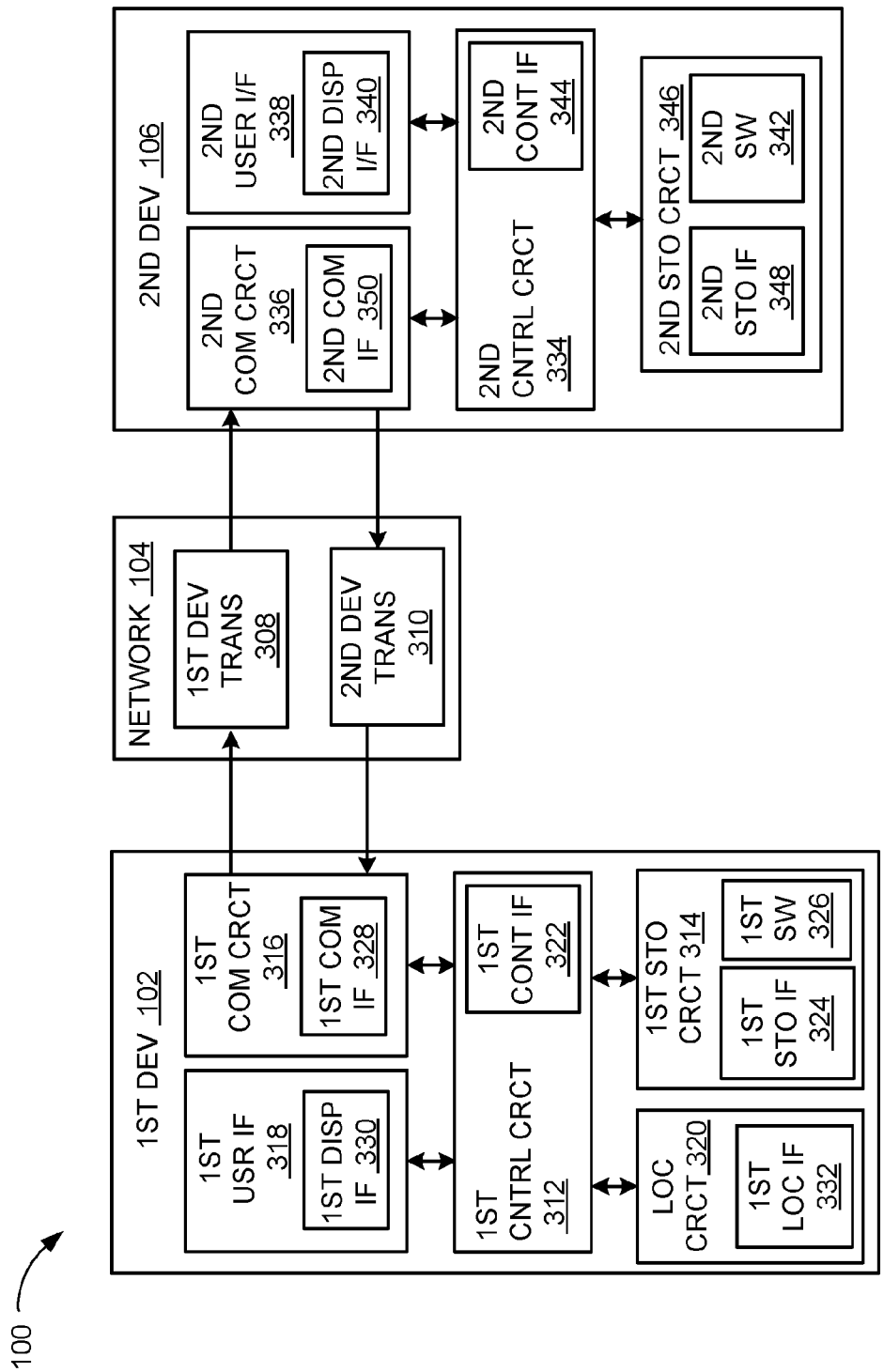
FIG. 3 is an exemplary block diagram of the navigation system.

Referring now to FIG. 3, therein is shown an exemplary block diagram of the navigation system 100. The navigation system 100 can include the first device 102, the network 104, and the second device 106. The first device 102 can send information in a first device transmission 308 over the network 104 to the second device 106. The second device 106 can send information in a second device transmission 310 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a location circuit 320. The first control circuit 312 can include a first control interface 322. The first control circuit 312 can execute a first software 326 to provide the intelligence of the navigation system 100.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the network 104.

The first communication circuit 316 can also function as a communication hub allowing the first device 102 to function as part of the network 104 and not limited to be an end point or terminal circuit to the network 104. The first communication circuit 316 can include active and passive components, such as microelectronics or an antenna, for interaction with the network 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs. The first user interface 318 can include the image capturing circuit 204 of FIG. 2.

The first user interface 318 can also include a first display interface 330. The first display interface 330 can include an output device. The first display interface 330 can include a display, a projector, a video screen, a speaker, or any combination thereof.

The first control circuit 312 can operate the first user interface 318 to display information generated by the navigation system 100. The first control circuit 312 can also execute the first software 326 for the other functions of the navigation system 100, including receiving location information from the location circuit 320. The first control circuit 312 can further execute the first software 326 for interaction with the network 104 via the first communication circuit 316.

The location circuit 320 can generate location information, current heading, current acceleration, and current speed of the first device 102, as examples. The location circuit 320 can be implemented in many ways. For example, the location circuit 320 can function as at least a part of the global positioning system, an inertial navigation system, a cellular-tower location system, a pressure location system, or any combination thereof. Also, for example, the location circuit 320 can utilize components such as an accelerometer or global positioning system (GPS) receiver.

The location circuit 320 can include a first location interface 332. The first location interface 332 can be used for communication between the location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control circuit 334 can execute a second software 342 to provide the intelligence of the second device 106 of the navigation system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the navigation system 100, including operating the second communication circuit 336 to communicate with the first device 102 over the network 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the navigation system 100 is shown with the second storage circuit 346 as a single hierarchy storage system, although it is understood that the navigation system 100 can have the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the network 104.

The second communication circuit 336 can also function as a communication hub allowing the second device 106 to function as part of the network 104 and not limited to be an end point or terminal unit or circuit to the network 104. The second communication circuit 336 can include active and passive components, such as microelectronics or an antenna, for interaction with the network 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the network 104 to send information to the second device 106 in the first device transmission 308. The second device 106 can receive information in the second communication circuit 336 from the first device transmission 308 of the network 104.

The second communication circuit 336 can couple with the network 104 to send information to the first device 102 in the second device transmission 310. The first device 102 can receive information in the first communication circuit 316 from the second device transmission 310 of the network 104. The navigation system 100 can be executed by the first control circuit 312, the second control circuit 334, or a combination thereof. For illustrative purposes, the second device 106 is shown with the partition having the second user interface 338, the second storage circuit 346, the second control circuit 334, and the second communication circuit 336, although it is understood that the second device 106 can have a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 4:
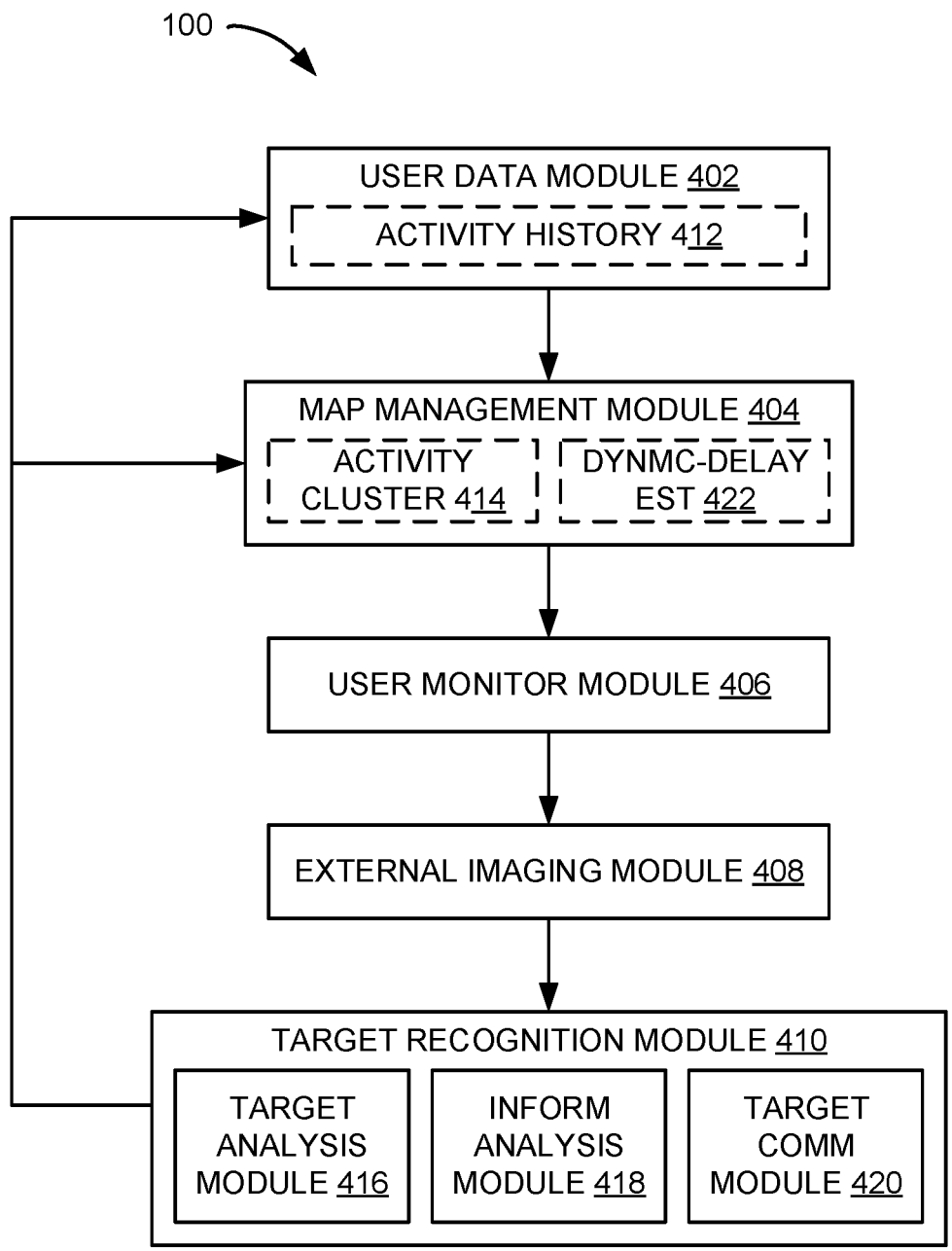
FIG. 4 is a control flow of the navigation system.

Referring now to FIG. 4, therein is shown a control flow of the navigation system 100. The navigation system 100 can include a user data module 402, a map management module 404, a user monitor module 406, an external imaging module 408, a target recognition module 410, or a combination thereof.

The user data module 402 can be coupled to the map management module 404, the target recognition module 410, or a combination thereof. The map management module 404 can be coupled to the user monitor module 406, the target recognition module 410, or a combination thereof. The user monitor module 406 can be coupled to the external imaging module 408. The external imaging module 408 can be coupled to the target recognition module 410.

The modules can be coupled using wired or wireless connections, by having an output of one module as an input of the other module, by having operations of one module influence operation of the other module, or a combination thereof. The modules can be directly coupled with no intervening structures or objects other than the connector there-between, or indirectly coupled.

The user data module 402 is configured to manage information regarding end users of the navigation system 100. The user data module 402 can manage, such as by creating or updating, profile information for each instance of the system user 108 of FIG. 1.

For example, the user data module 402 can create the profile information based on interacting with the system user 108. Also for example, the user data module 402 can create the profile information based on information from other databases or service regarding or describing each of the system user 108, such as for social-networking services, membership based services or features, other accounts, or a combination thereof.

The profile information can include descriptions of each corresponding end user. For example, the profile information can include identification information, demographic information, usage information, current or previous records, preference information, connections or relationship to other users, or a combination thereof. As a more specific example, the profile information can include name, account name or number, identification information of devices or vehicles associated with or owned by the user, age, residence location, gender, profession, previous education or training, search records, requested or traversed routes, desired settings, interest areas, social connections, information regarding friends or family, or a combination thereof.

The user data module 402 can further determine the current location 228 of FIG. 2. The user data module 402 can determine the current location 228 representative or corresponding to the first device 102 of FIG. 1. The user data module 402 can determine the current location 228 further representing the location of the corresponding instance of the system user 108.

The user data module 402 can determine the current location 228 based on the location information from the location unit 320 of FIG. 3. The user data module 402 can further determine the current location 228 using one or more of the communication circuits, such as the first communication circuit 316 of FIG. 3 or the second communication circuit 336 of FIG. 3, one or more of the control circuits, such as the first control circuit 312 of FIG. 3 or the second control circuit 334 of FIG. 3, or a combination thereof.

The user data module 402 can store the current location 228 of the system user 108 to track or trace movement of the system user 108. The user data module 402 can store the current location 228 as part of the profile information or location history. The user data module 402 can store the current location 228 according to the current time of the determination. The user data module 402 can store the current location 228 in one or more of the storage circuits, such as the first storage circuit 314 of FIG. 3 or the second storage circuit 346 of FIG. 3.

The user data module 402 can further manage the profile information based on information or results fed back from the target recognition module 410. For example, the user data module 402 can manage an activity history 412. The activity history 412 can include a record of the augmented output 248 of FIG. 2, the sign-content estimate 246 of FIG. 2, the target estimate 236 of FIG. 2, confirmations or validations thereof, the current location 228 corresponding thereto, the user cue 212 of FIG. 2 corresponding thereto, the contextual parameters 226 of FIG. 2 corresponding thereto, the user orientation 216 of FIG. 2 corresponding thereto, searches or requests corresponding thereof, or a combination thereof.

The user data module 402 can manage the profile information based on one or more of the control circuits, one or more of the communication circuits, the location circuit 320, or a combination thereof discussed above. The user data module 402 can store the profile information or any other processed information in one or more of the storage circuits discussed above.

After managing information regarding previous locations and movements, the control flow can pass from the user data module 402 to the map management module 404. For example, the control flow can pass by having a processing result, such as the profile information, the activity history 412, a portion thereof, or a combination thereof as an output from the user data module 402 to an input of the map management module 404.

Also for example, the control flow can further pass by storing the processing result at a location known and accessible to the map management module 404. Also for example, the control flow can further pass by notifying the map management module 404, such as by using a flag, an interrupt, a status signal, or a combination thereof. Also for example, the control flow can further pass using a combination of the processes described above.

The map management module 404 is configured to manage map information. The map management module 404 can manage, such as by accessing and updating, the map including the map entity 250 of FIG. 2, the map-entity detail 252 of FIG. 2, or a combination thereof.

The map management module 404 can manage the map information, such as maps predetermined by the navigation system 100 or generate maps based on information from one or more end-users. The map management module 404 can access and update the map information stored in one or more of the communication circuits discussed above. The map management module 404 can further access and update the map information using one or more of the control circuits, one or more of the communication circuits, or a combination thereof discussed above.

The map management module 404 can further identify an activity cluster 414 based on the activity history 412. The map management module 404 can identify the activity cluster 414 representing a concentration or a pattern of items in the activity history 412. The activity cluster 414 can include a commonality or a pattern in the current location 228, time, one or more instances of the contextual parameters 226, or a combination thereof across multiple instances of the user orientation 216, the sign-content estimate 246, the target estimate 236, the augmented output 248, or a combination thereof corresponding to one or more end-users.

The map management module 404 can identify the activity cluster 414 based on geographic concentration or overlap. The map management module 404 can map or analyze the target estimate 236, the augmented output 248, the sign-content estimate 246, or a combination thereof with the current location 228 of the system user 108 associated thereto at the time of processing.

The map management module 404 can use a pattern recognition mechanism, a machine-learning mechanism, or a combination thereof to identify the activity cluster 414 as a concentration or an overlap of the target estimate 236, the augmented output 248, the sign-content estimate 246, or a combination thereof at a geographic location. The map management module 404 can further utilize a geographical threshold or distribution function assigning a value to geographic locations centered at each of the processing locations. The map management module 404 can determine the activity cluster 414 as the geographic location with resulting combined weight values exceeding a threshold predetermined by the navigation system 100.

The map management module 404 can further analyze the activity cluster 414 according to the time of occurrence. For example, the map management module 404 can identify the activity cluster 414 within a specific time period in the past or within a recent time window extending back from the current time by a specified duration.

The map management module 404 can identify the activity cluster 414 corresponding to the target estimate 236 or the augmented output 248 commonly or frequently requested, generated, or processed by the navigation system 100. The map management module 404 can further identify the activity cluster 414 corresponding to the current location 228 of the system user 108 associated with or causing common or frequent requests, generations, or processing of the target estimate 236 or the augmented output 248.

For example, the map management module 404 can identify the activity cluster 414 based on targets or visual information commonly or frequently sought by the end users, the current location 228 from which end users commonly or frequently seek certain visual information, or a combination thereof. The activity cluster 414 can be linked to popular locations, information difficult to view, user locations associated with negative influences along the LOS, or a combination thereof.

The map management module 404 can further update the map information based on information fed back from the target recognition module 410. For example, the map management module 404 can update the map-entity detail 252 based on the target estimate 236, the sign-content estimate 246, the verification thereof, or a combination thereof. Details regarding the updates are discussed below.

The map management module 404 can manage the map information along with identifying the activity cluster 414 using one or more of the control circuits, one or more of the communication circuits, or a combination thereof discussed above. The map management module 404 can access the map information for the management process using one or more of the device interfaces, such as the first control interface 322 of FIG. 3, the second control interface 344 of FIG. 3, the first storage interface 324 of FIG. 3, the second storage interface 346 of FIG. 3, the first communication interface 328 of FIG. 3, the second communication interface 350 of FIG. 3, or a combination thereof discussed above. The map management module 404 can store the map information along with the map-entity detail 252 in one or more of the storage circuits discussed above.

After managing the map information, the control flow can pass from the map management module 404 to the user monitor module 406. The control flow can pass in a manner similar to the manner described above between the user data module 402 and the map management module 404, but using the processing results of the map management module 404, such as the map information, the activity cluster 414, or a combination thereof.

The user monitor module 406 is configured to process current information regarding the system user 108. The user monitor module 406 can process the current information based on analyzing visual information regarding the system user 108, identifying the user cue 212, determining the contextual parameters 226, capturing and analyzing the user image 214 of FIG. 2, or a combination thereof.

The user monitor module 406 can identify the user cue 212 in a variety of ways. For example, the user monitor module 406 can identify the user cue 212 from audible or sound information or commands generated or produced by the system user 108. Also for example, the user monitor module 406 can identify the user cue 212 based on haptic or contact interaction between the system user 108 and the first device 102.

Also for example, the user monitor module 406 can identify the user cue 212 based on visual information of the system user 108 from the internal capturing circuit 206 of FIG. 2. As a more specific example, the user monitor module 406 can observe the system user 108 using the internal capturing circuit 206 while the system user 108 rides in or operates the vehicle 202 of FIG. 2. Also for example, the user monitor module 406 can identify the user cue 212 using a combination of above examples or other processes or methods.

The user monitor module 406 can identify the user cue 212 based on recognizing the various information of or from the system user 108, such as the visual information, audible or spoken information, contact information, or a combination thereof exemplified above. For example, the user monitor module 406 can identify the user cue 212 based on matching the various information to a command or a mode within a template, a threshold, a limit, or a combination thereof predetermined by the navigation system 100. As a more specific example, the user monitor module 406 can utilize speech-to-text or other speech recognition mechanism, an image recognition mechanism, visual markers and templates or threshold ranges thereof, activation of specific buttons or contact location a graphical user interface, a sequence thereof, or a combination thereof.

The user monitor module 406 can further monitor the system user 108 based on determining the contextual parameters 226 associated with the system user 108 at the current time. The user monitor module 406 can determine the contextual parameters 226, such as the movement detail 230 of FIG. 2, the visibility factor 232 of FIG. 2, the predictive factor 234 of FIG. 2, or a combination thereof. The user monitor module 406 can further determine the current location 228 instead of the user data module 402.

The user monitor module 406 can determine the contextual parameters 226 in a variety of ways. For example, the user monitor module 406 can determine the movement detail 230, the current location 228, or a combination thereof based on the location information, such as for speed, heading, acceleration, orientation, or a combination thereof, from the location unit 320. The user monitor module 406 can further access the location information using one or more of the interfaces, one or more of the communication circuits, or a combination thereof discussed above.

Also for example, the user monitor module 406 can determine the contextual parameters 226 based on accessing a user calendar, an inbox or a message box for text-based messages, a call log, or a combination thereof. Also for example, the user monitor module 406 can determine the contextual parameters 226 based on identifying other user devices within a threshold distance to the first device 102, identifying the end-users associated with the other devices, identifying the relationship between the system user 108 and the other users, or a combination thereof.

Also for example, the user monitor module 406 can determine the contextual parameters 226 based on accessing other database or other sources of information predetermined or designated by the navigation system 100, such as weather services, obstruction report database or traffic management services, user health records or user profile, or a combination thereof for the visibility factor 232. Also for example, the user monitor module 406 can determine the contextual parameters 226 based on accessing the current requested route of the system user 108, historical models of traffic flow corresponding to location and time, or a combination thereof.

The user monitor module 406 can further determine the contextual parameters 226 based on additional processing of the available or detectable data. For example, the user monitor module 406 can calculate a weight or contribution factor for the visibility factor 232 based on the available or detected information described or exemplified above, such as based on the weather conditions, the user conditions, the movement detail 230, the obstruction report, or a combination thereof.

Also for example, the user monitor module 406 can determine the contextual parameters 226 based on estimating a destination and a corresponding route for the current travel of the system user 108 if the user has not requested a route. The user monitor module 406 can estimate based on patterns in location history of the system user 108, communicated content, or a combination thereof.

Also for example, the user monitor module 406 can determine the contextual parameters 226 including the predictive factor 234 based on a variety of ways. As a more specific example, the user monitor module 406 can determine the predictive factor 234 based on calculating a distance between the current location 228 and a POI with popularity rating exceeding a threshold. Also as a more specific example, the user monitor module 406 can determine the predictive factor 234 based on the current location 228 in geographic relation to the maneuver relative location of the requested route or the estimated route.

Also as a more specific example, the user monitor module 406 can determine the predictive factor 234 based on a pattern of movement for the system user 108, such as for slowing down the vehicle 202 more than the historical record or other surrounding vehicles. Also as a more specific example, the user monitor module 406 can determine the predictive factor 234 based on the activity estimate generated from matching one or more of the contextual parameters 226. Also as a more specific example, the user monitor module 406 can determine the contextual parameters 226 using a combination of the processes or methods exemplified above or other processes or methods.

The user monitor module 406 can further identify the user cue 212 based on one or more of the contextual parameters 226. For example, the user monitor module 406 can identify the user cue 212 as one or more of the contextual parameters 226 predetermined by the navigation system 100.

Also for example, the user monitor module 406 can anticipate or predict the user cue 212 based on the contextual parameters 226, such as the visibility factor 232 or the predictive factor 234, the activity cluster 414, or a combination thereof. The user monitor module 406 can wake up or trigger devices to observe the system user 108, increase the processing capabilities or allocated resources for identifying the user cue 212, or a combination thereof based on anticipating or predicting the user cue 212.

Also for example, the user monitor module 406 can identify the user cue 212 according to the visibility factor 232 representing or corresponding to bad visibility as predetermined by the navigation system 100, the predictive factor 234 corresponding to behaviors occurring when a driver is looking at or focused on an object or an event outside of the vehicle 202, or a combination thereof. Also for example, the user monitor module 406 can utilize a combination of the methods or processes exemplified above or other methods or processes to identify the user cue 212.

The user monitor module 406 can also determine the contextual parameters 226 based on identifying the user cue 212. For example, the user monitor module 406 can determine the current location 228, the movement detail 230, the visibility factor 232, the predictive factor 234, or a combination thereof upon identifying the user cue 212. The user monitor module 406 can determine the contextual parameters 226 as discussed above. The user monitor module 406 can further utilize the visibility factor 232, the predictive factor 234, or a combination thereof to verify the user cue 212 rather than anticipating the user cue 212.

Alternatively, the contextual parameters 226 of the system user 108 can be determined and tracked in real-time using the user data module 402, the map management module 404, or a combination thereof. For example, the user data module 402 can determine and track the current location 228, the movement detail 230, or a combination thereof. Also for example, the map management module 404 can determine and track the visibility factor 232, the predictive factor 234, or a combination thereof.

The user monitor module 406 can process the user image 214 of FIG. 2. For example, the user monitor module 406 can continually process or monitor the user image 214, such as for video data, for the user cue 212. Also for example, the user monitor module 406 can capture and process the user image 214 based on or in response to the user cue 212.

The user monitor module 406 can process the user image 214 for determining the user orientation 216. The user monitor module 406 can determine or calculate the user orientation 216 based on or from physical markers of the system user 108 in the user image 214. The user monitor module 406 can determine or calculate the user orientation 216 using image processing or recognition mechanism, trigonometry or geometry, mapping mechanism, angle measurements, or a combination thereof. The user monitor module 406 can further determine or calculate the user orientation according to a method or a process predetermined by the navigation system 100.

For example, the user monitor module 406 can determine or calculate the user orientation 216 based on location or direction of the user's eyes, face, torso, arm, hand, fingers, or a combination thereof. The user monitor module 406 can calculate the user orientation 216 as a direction, a vector, an angle, a coordinate, or a combination thereof representing a focus direction or location of the system user 108 indicated or captured in the user image 214. The user monitor module 406 can calculate the user orientation 216 based on a location of one or more physical markers of the system user 108 relative to another physical marker, a reference location or portion of the vehicle 202, a reference coordinate system, or a combination thereof.

The user monitor module 406 can capture the user image 214 using the internal capturing circuit 206. The user monitor module 406 can determine or calculate the user orientation 216 using the first device 102, the second device 106 of FIG. 1, or a combination thereof. For example, the user monitor module 406 can capture the user image 214 and further determine or calculate the user orientation 216 all at or using the first device 102. The first device 102 can further send or transmit the user orientation 216 to the second device 106.

Also for example, the user monitor module 406 can capture the user image 214 at the first device 102 and transmit or send the user image 214 from the first device 102 to the second device 106. The second device 106 can receive the user image 214 captured and sent from the first device 102. The second device 106 can calculate the user orientation 216 from the user image 214 as discussed and exemplified above. The second device 106 can further send or transmit the user orientation 216 to the first device 102. Also for example, the user monitor module 406 can utilize a combination of processes or methods exemplified above or divide or share the processes or methods between the first device 102 capturing the user image 214 and the second device 106 differently.

The user monitor module 406 can process information regarding the system user 108 using one or more of the user interfaces, including the internal capturing circuit 206, one or more of the communication circuit, one or more of the control circuit, or a combination thereof discussed above. The user monitor module 406 can store the received or incoming information, the processing results, such as the contextual parameters 226 or the user orientation 216, in one or more of the storage circuits discussed above.

After processing real-time or current information regarding the system user 108, the control flow can pass from the user monitor module 406 to the external imaging module 408. The control flow can pass in a manner similar to the manner described above between the user data module 402 and the map management module 404, but using the processing results of the user monitor module 406, such as the user image 214, the user orientation 216, or a combination thereof.

The external imaging module 408 is configured to capture visual information regarding surrounding environment of the system user 108. The external imaging module 408 can capture the visual information corresponding to the user orientation 216, the user cue 212, or a combination thereof.

The external imaging module 408 can capture the visual information based on capturing the external image 220 of FIG. 2. The external imaging module 408 can capture the external image 220 using the external capturing circuit 208 of FIG. 2, the alignment circuit 210 of FIG. 2, or a combination thereof. The external imaging module 408 can capture the external image 220 at or using the first device 102, the vehicle 202, or a combination thereof. The external imaging module 408 can capture the external image 220 outside of the vehicle 202.

The external imaging module 408 can capture the external image 220 in a variety of ways. For example, the external imaging module 408 can capture or take the external image 220 based on or in response to the user cue 212. The external imaging module 408 can control the external capturing circuit 208 to capture or store the visual information based on or in response to the user cue 212.

Also for example, the external imaging module 408 can capture or take the external image 220 based on or according to the user orientation 216. The external imaging module 408 can calculate the target image vector 218 of FIG. 2 based on the user orientation 216, known or predetermined orientation of the internal capturing circuit 206, reference locations within the vehicle 202, a heading or direction of the vehicle 202 according to the movement detail 230, an orientation of the vehicle 202 as indicated by the movement detail 230, an orientation or a direction of the road or path corresponding to the current location 228 according to the map information, or a combination thereof.

Continuing with the example, the external imaging module 408 can calculate the target image vector 218 based on mapping or translating the user orientation 216 to the real-world or geographic space around the system user 108 and the vehicle 202. The external imaging module 408 can calculate the target image vector 218 based on extrapolating the user orientation 216 in relation to the internal capturing circuit 206 to the real-world or geographic space according to the various other factors discussed above. The external imaging module 408 can include a method, a process, an equation, or a combination thereof for calculating the target image vector 218.

Continuing with the example, the external imaging module 408 can capture the external image 220 using a specific instance or portion of the external capturing circuit 208 corresponding to the target image vector 218. As a more specific example, the external imaging module 408 can utilize a specific camera, such as a front-facing camera or a side-facing camera, oriented or affixed along a direction similar to the target image vector 218 or covering the target image vector 218.

Also for example, the external imaging module 408 can capture the external image 220 as the directed image 222 of FIG. 2 based on controlling or directing the alignment circuit 210 according to the target image vector 218. The external imaging module 408 can capture the external image 220 for capturing the directed image 222 for representing the external image 220 captured by the image capturing circuit 204 of FIG. 2 aligned according to the user orientation 216 through the alignment circuit 210.

Also for example, the external imaging module 408 can control or direct the alignment circuit 210 to point or orient the external capturing circuit 208 along a direction congruent to, matching, including, associated with, or a combination thereof in relation to the target image vector 218. The external imaging module 408 can capture the directed image 222 by capturing the visual information after controlling or directing the alignment circuit 210 according to the target image vector 218 resulting from the user orientation 216.

Also for example, the external imaging module 408 can further utilize the first device 102, the second device 106, or a combination thereof in a variety of ways to capture and process visual information. For example, the external imaging module 408 can utilize the first device 102 to calculate the target image vector 218, control the alignment circuit 210, control the external capturing circuit 208, or a combination thereof. As a more specific example, the external imaging module 408 can utilize the first device 102 to calculate the target image vector 218, control the alignment circuit 210, and control the external capturing circuit 208 without the second device 106.

Also for example, the external imaging module 408 can utilize the second device 106 to calculate the target image vector 218 based on the user orientation 216 or the user image 214 received from the first device 102. The external imaging module 408 can transmit or send the target image vector 218 from the second device 106 to the first device 102 for taking capturing the external image 220 using the image capturing circuit 204 on or integral with the first device 102.

Continuing with the example, the external imaging module 408 can calculate, generate, or determine the specific control signals or device instructions corresponding to the target image vector 218 at the first device 102 based on the target image vector 218. The external imaging module 408 can further implement the specific control signals or device instructions corresponding to the target image vector 218 sent from the second device 106 along with or in place of the target image vector 218.

Also for example, the external imaging module 408 can utilize and control the image capturing circuit 204 on the vehicle 202 through the first device 102. The first device 102, the second device 106, or a combination thereof can calculate the target image vector 218, process the specific control signals or device instructions, communicate and exchange various information, or a combination thereof as discussed above. The first device 102 can communicate or control the alignment circuit 210, the external capturing circuit 208, or a combination thereof included in or integral with the vehicle 202 using the target image vector 218, the specific control signals or device instructions, or a combination thereof to capture the external image 220.

Also for example, the external imaging module 408 can further transmit or send the target image vector 218, the specific control signals or device instructions, or a combination thereof directly to the vehicle 202 for taking or capturing the external image 220. The external imaging module 408 can use the second device 106 to directly control the vehicle 202 without utilizing the first device 102 to take or capture the external image 220.

Also for example, the external imaging module 408 can use the first device 102, the second device 106, or a combination thereof to recall previously taken or captured instance of the external image 220 matching the current location 228, the target image vector 218, or a combination thereof. The external imaging module 408 can include images stored according to the current location 228, the target image vector 218, or a combination thereof. The external imaging module 408 can access and recall the external image 220 based on current instance of the current location 228, the target image vector 218, or a combination thereof at the time or instance of the user cue 212. The external imaging module 408 can utilize the previous instance of the external image 220 as the current instance of the external image 220, along with the current instance of the external image 220, or a combination thereof.

The external imaging module 408 can further communicate or exchange the external image 220 between devices or circuits of the navigation system 100 to capture the external image 220. For example, the external imaging module 408 can send or transmit the external image 220 from the first device 102, the vehicle 202, or a combination thereof. The external imaging module 408 can receive the external image 220 at the second device 106, the first device 102, or a combination thereof.

The external imaging module 408 can use one or more of the control circuits discussed above to calculate the target image vector 218, process the specific control signals or device instructions, or a combination thereof. The external imaging module 408 can use one or more of the communication circuits discussed above to communicate or exchange the various information between devices.

The external imaging module 408 can further store and access the target image vector 218, the specific control signals or device instructions, the external image 220, or a combination thereof using one or more of the storage circuits discussed above. The external imaging module 408 can utilize the image capturing circuit 204 to implement specific control signals or device instructions and capture the visual information for the external image 220.

After capturing the visual information regarding surrounding environment, the control flow can pass from the external imaging module 408 to the target recognition module 410. The control flow can pass in a manner similar to the manner described above between the user data module 402 and the map management module 404, but using the processing results of the external imaging module 408, such as the external image 220, the target image vector 218, or a combination thereof.

The target recognition module 410 is configured to process a content within the external image 220. The target recognition module 410 can analyze the external image 220, estimate or determine information beneficial to or sought by the system user 108, communicate the information to the system user 108, or a combination thereof. The target recognition module 410 can include a target analysis module 416, an information analysis module 418, a target communication module 420, or a combination thereof.

The target analysis module 416 is configured to analyze the external image 220 based on direction or location. The target analysis module 416 can determining the target estimate 236, the vector correlation zone 224 of FIG. 2, or a combination thereof within or from the external image 220 based on the direction or location analysis of the external image 220. The target analysis module 416 can determine the target estimate 236, the vector correlation zone 224, or a combination thereof based on the user orientation 216, the target recognition template, the target image vector 218, or a combination thereof.

The target analysis module 416 can analyze the external image 220 according to the physical direction or location indicated by the system user 108. The target analysis module 416 can identify a portion or an area in the external image 220 that corresponds to the user orientation 216, the target image vector 218, or a combination thereof.

The target analysis module 416 can determine the target estimate 236, the vector correlation zone 224, or a combination thereof based on the portion or the area in the external image 220. The target analysis module 416 can identify the portion or the area in the external image 220 based on a process or a method similar to the process or the method discussed above for calculating the target image vector 218.

For example, the target analysis module 416 can extend the target image vector 218 to a point or a location in the real world. The target analysis module 416 can map the point or the location relative to a position, an orientation, or a combination thereof corresponding to the external capturing circuit 208, the alignment circuit 210, or a combination thereof in the real world or physical space. The target analysis module 416 can use the mapping to determine the portion or the corresponding area in the external image 220 or identify the portion or the area in the external image 220 matching or aligned with the target image vector 218 to determine the target estimate 236, the vector correlation zone 224, or a combination thereof.

The target analysis module 416 can further identify potential targets within the external image 220. The potential targets can include representations of physical objects or visually depicted information captured in the external image 220. The potential targets can include representations of the physical sign 238 of FIG. 2 including various information.

The target analysis module 416 can identify the potential targets based on the target recognition template. For example, the target analysis module 416 can identify the potential targets as representations of the physical sign 238 based on the portions of the image matching the target recognition template for characterizing the physical sign 238. As a more specific example, the target analysis module 416 can compare lines, colors, shapes, or a combination thereof captured in the external image 220 to thresholds, limits, shape or color templates, or a combination thereof predetermined by the navigation system 100 for representing outlines or physical appearances of common or known instances of signs.

The potential targets can include representations of the map entity 250 or information associated thereto. The target analysis module 416 can identify the potential targets based on the map-entity detail 252 for the map entity 250 known or determined to be located within or along the target image vector 218 according to the map data.

The target analysis module 416 can identify the potential targets for determining the target estimate 236. The target analysis module 416 can identify the potential targets for an entirety of the external image 220 or within the vector correlation zone 224. The target recognition module 410 can determine the target estimate 236 as one or more instances of the potential target matching or satisfying other parameters.

The target analysis module 416 can determine the target estimate 236 based on the user orientation 216 using the target image vector 218, the external image 220, the vector correlation zone 224, or a combination thereof resulting from or associated with the user orientation 216. The target analysis module 416 can determine the target estimate 236 in a variety of ways. For example, the target analysis module 416 can determine the target estimate 236 as the potential target when only one potential is found within the vector correlation zone 224.

Also for example, the target analysis module 416 can determine the target estimate 236 based on the contextual parameters 226, the activity cluster 414, or a combination thereof. As a more specific example, the target analysis module 416 can determine the target estimate 236 as the potential target matching or indicated in the activity cluster 414 for representing multiple overlapping determinations of the sign-content estimate 246, such as for popular POI or often-requested information.

Also as a more specific example, the target analysis module 416 can determine the target estimate 236 based on the visibility factor 232, the predictive factor 234, or a combination thereof. The target analysis module 416 can determine multiple instances of the target estimate 236 when the visibility factor 232 indicates poor visible conditions.

Continuing with the example, the target analysis module 416 can further determine the target estimate 236 as the location, the entity, the structure, the physical sign 238, or a combination thereof obstructed or hidden in the external image 220. The target analysis module 416 can detect obstructions or absence of the location, the entity, the structure, the physical sign 238, or a combination thereof based on comparing the external image 220 with recognized objects therein, the map entity 250 and the map-entity detail 252 for the corresponding locations or area, previous instances of the external image 220 for the targeted area or location, or a combination thereof.

Also as a more specific example, the target analysis module 416 can determine the target estimate 236 based on analyzing the map-entity detail 252 of the map entity 250 represented within the vector correlation zone 224 or along the target image vector 218. The target analysis module 416 can determine the target estimate 236 as the potential target or the map entity 250 matching the activity estimate for the system user 108. The target analysis module 418 can determine the match based on categories or clusters corresponding to machine learning mechanism, pattern or keyword matching mechanism, or a combination thereof.

Also as a more specific example, the target analysis module 416 can calculate a weight for each of the potential targets or each instance of the map entity 250 represented within the vector correlation zone 224 from the contextual parameters 226, the current location 228, the target image vector 218, the map-entity detail 252, or a combination thereof. The target analysis module 416 can utilize a method, a process, an equation, or a combination thereof predetermined by the navigation system for calculating the weight. The target analysis module 416 can determine the target estimate 236 as one or more potential targets corresponding to the weight satisfying a threshold or a limit predetermined by the navigation system 100.

Also as a more specific example, the target analysis module 416 can determine the target estimate 236 directly from the target image vector 218 when the target image vector 218 is known to be reliable, such as for systems utilizing multiple instances of the internal capturing circuit 206 and multiple user images, higher quality cameras and resulting images, higher reliability in the external image 220 matching the user's view point, or a combination thereof. Also for example, the target analysis module 416 can utilize a combination of above examples or other methods or process to determine the target estimate 236.

Also as a more specific example, the target analysis module 416 can calculate the relative distance of FIG. 2, the relative position of FIG. 2, or a combination thereof for one or more of the potential targets relative to the current location 228, the movement detail 230, the user orientation 216, or a combination thereof. The target analysis module 416 can compare the relative distance, the relative position, or a combination thereof to the target image vector 218 to determine a matching or a qualifying instance of the potential target as the target estimate 236.

The target analysis module 416 can further identify the image-address indicator 240 of FIG. 2 in the external image 220. The target analysis module 416 can identify the image-address indicator 240 as specific region or location within the external image 220, shapes or colors therein, or a combination thereof. The target analysis module 416 can identify the image-address indicator 240 similar to recognizing images of the physical sign 238 as discussed above.

The target analysis module 416 can determine a match or a relationship between the image-address indicator 240 in the image with a location, a building, a structure, the map entity 250, or a combination thereof existing in the real-world or in the space around the current location 228. The target analysis module 416 can determine the match or the relationship using one or more of the spatial mapping and vector calculation methods or processes discussed above.

The information analysis module 418 is configured to analyze content information within the external image 220 corresponding to the target estimate 236. The information analysis module 418 can analyze the content based on determine the sign-content estimate 246 of the target estimate 236 from the external image 220. The information analysis module 418 can determine the sign-content estimate 246 of the target estimate 236 corresponding to the user orientation 216, the current location 228, the target image vector 218, or a combination thereof as discussed above.

The information analysis module 418 can analyze the content in a variety of ways. For example, the information analysis module 418 can use image recognition mechanism or optical character recognition mechanism to determine the sign-content estimate 246 of the target estimate 236 from the target analysis module 416. Also for example, the information analysis module 418 can use previous images, the map-entity detail 252 for the area corresponding to the current location 228 and the target image vector 218, or a combination thereof to determine the sign-content estimate 246 of the target estimate 236.

The information analysis module 418 can further determine the sign-content estimate 246 for the image-address indicator 240 identified in the external image 220. The information analysis module 418 can analyze the content for the sign-content estimate 246, such as by recognizing the numbers or characters representing address information as depicted in the external image 220, using the process, the method, the mechanism, or a combination thereof discussed above.

The target recognition module 410 can further analyze content information in a different way. For example, the target recognition module 410 can execute or implement the information analysis module 418 before the target analysis module 416. The information analysis module 418 can recognize the content throughout the entirety of the external image 220 instead of just the target estimate 236, the image-address indicator 240, the vector correlation zone 224, or a combination thereof.

Continuing with the example, the target analysis module 416 can determine the potential targets, the target estimate 236, or a combination thereof as discussed above. The target analysis module 416 can further utilize the content information or the sign-content estimate 246 from the information analysis module 418 to determine the potential targets, the target estimate 236, or a combination thereof.

As a more specific example, the target analysis module 416 utilize the content information or the sign-content estimate 246 to identify or verify portions within the external image 220 as matching the map entity 250 or the map-entity detail 252 and map the external image 220 to the map data. Also as a more specific example, the target analysis module 416 utilize the content information or the sign-content estimate 246 to determine matches to or contextual relevance in light of the contextual parameters 226.

Also for example, the target recognition module 410 can execute or implement the target analysis module 416 and the information analysis module 418 in an iterative matter. The target analysis module 416 can be implemented or executed before the information analysis module 418. The information analysis module 418 can analyze text within the entirety of the external image 220. The text information can be fed back to the target analysis module 416 and the target analysis module 416 can utilize the text information for determining or verifying the target estimate 236 based on matching the contextual parameters 226.

The target communication module 420 is configured to utilize or implement the sign-content estimate 246 of the target estimate 236 for the system user 108. The target communication module 420 can utilize or implement by generating and communicating the augmented output 248 of FIG. 2.

The target communication module 420 can generate the augmented output 248 for representing the physical sign 238 captured in the external image 220 and determined to be the target estimate 236. The target communication module 420 can communicate the augmented output 248 between devices, such as the first device 102 and the second device 106, between the system user 108 and one or more devices, such as through the first device 102, or a combination thereof for describing the physical sign 238 to the system user 108 using the device.

The target communication module 420 can generate the augmented output 248 as visual information or representation of the sign-content estimate 246. The target communication module 420 can further generate the augmented output 248 as audible information or representation of the sign-content estimate 246, such as using text-to-speech mechanism.

The target communication module 420 can communicate or exchange the sign-content estimate 246 between devices using one or more of the communication circuits. The target communication module 420 can communicate the sign-content estimate 246 through the first device 102, the second device 106, or a combination thereof. The target communication module 420 can utilize one or more of the devices to communicate the sign-content estimate 246, such as by displaying the added text over the external image 220 or by generating audible sounds corresponding to the sign-content estimate 246.

The target communication module 420 can further receive confirmations or adjustment requests from the system user 108 in response to the augmented output 248. The target communication module 420 can receive by detecting or identifying stimulus or input information regarding the augmented output 248 from the system user 108 through the user interface, one or more communication circuits, or a combination thereof subsequent to communication of the augmented output 248.

The target recognition module 410 can process the content using the devices, such as the first device 102 or the second device 106, in a variety of ways. For example, the target recognition module 410 can analyze the external image 220, identify potential targets, determine the target estimate 236, identify the image-address indicator 240, analyze content information, determine the sign-content estimate 246, generate the augmented output 248, communicate the augmented output 248, or a combination thereof using or at the first device 102, the second device 106, or a combination thereof.

As a more specific example, the target recognition module 410 can process the external image 220, determine the target estimate 236, identify the image-address indicator 240, determine the sign-content estimate 246, generate the augmented output 248, or a combination thereof at or using the first device 102. Also as a more specific example, the target recognition module 410 can process the external image 220, determine the potential targets, determine the target estimate 236, identify the image-address indicator 240, determine the sign-content estimate 246, generate the augmented output 248, or a combination thereof at the second device 106 based on the external image 220 received from the first device 102. The second device 106 can communicate the processing output or result to the first device 102 for further subsequent processing. The first device 102 can be used to communicate the augmented output 248 to the system user 108.

The target recognition module 410 can process the content within the external image 220 using one or more of the control circuits discussed above. The target recognition module 410 can further exchange data, processing results, or a combination thereof using one or more of the communication circuits discussed above. The target recognition module 410 can communicate the augmented output 248 using the first user interface 318. The target recognition module 410 can further store the various data or processing results, including the target estimate 236, the sign-content estimate 246, the augmented output 248, or a combination thereof in one or more of the storage circuits discussed above.

For an illustrative example, the navigation system 100 can process the user cue 212 and the user image 214 from the internal capturing circuit 206 to predict or estimate intent or need of the system user 108 during user's operation or occupancy in the vehicle 202. The navigation system 100 can process the user orientation 216 and subsequently process the target image vector 218 in relation to the current location 228 to determine the target estimate 236 the system user 108 may be seeking or viewing.

Continuing with the example, the navigation system 100 can dynamically predict or determine the location, the entity, the POI, the physical sign 238, or a combination thereof near the system user 108 corresponding to the map entity 250 the system user 108 may be trying to view while driving or riding the vehicle 202. The navigation system 100 can dynamically determine the augmented output 248 specifically based on the user orientation 216 instead of relying on the system user 108 to physically move and point the image capturing circuit 204 to the desired location or orientation. The navigation system 100 can communicate the augmented output 248 for assisting the system user 108 during operation of the vehicle 202.

After processing the content within the external image 220, the control flow can pass from the target recognition module 410 to the user data module 402, the map management module 404, or a combination thereof. The control flow can pass in a manner similar to the manner described above between the user data module 402 and the map management module 404, but using the processing results of the target recognition module 410, such as the potential targets, the target estimate 236, the image-address indicator 240, the sign-content estimate 246 associated thereto, the augmented output 248, or a combination thereof.

The map management module 404 can update the map-entity detail 252 based on verification of the augmented output 248, the sign-content estimate 246, the image-address indicator 240, or a combination thereof. For example, the map management module 404 can update the map-entity detail 252 based on the activity cluster 414 corresponding to the image-address indicator 240, the map-entity detail 252 for representing the map entity 250 corresponding to the image-address indicator 240.

Continuing with the example, the map management module 404 can generate the activity cluster 414 for the image-address indicator 240, the sign-content estimate 246, or a combination thereof corresponding to the map entity 250. The map management module 404 can utilize the image-address indicator 240 occurring over a threshold amount or rate to correct the map-entity detail 252.

The map management module 404 can further determine traffic flow based on the external image 220 and the user cue 212. The map management module 404 can determining a dynamic-delay estimate 422 based on the external image 220 and the activity cluster 414 with the dynamic-delay estimate 422 for representing an influence or a source of delay on a traffic flow rate, such as for accidents, vehicle break-downs, unexpected obstructions, or a combination thereof.

For example, the map management module 404 can utilize the user cue 212 corresponding to the system user 108 viewing or looking at accidents or events on the road. The map management module 404 can take or capture the external image 220. The map management module 404 can utilize image analysis mechanism to identify disfigured vehicles, emergency vehicles, or a combination thereof in the external image 220.

Continuing with the example, the map management module 404 can similarly process the activity cluster 414 for incoming images corresponding to the same location. The map management module 404 can dynamically determine the dynamic-delay estimate 422 based on the number of instances or result of the activity cluster 414 satisfying a threshold or a limit predetermined by the navigation system 100. The navigation system 100 can utilize the dynamic-delay estimate 422 to further provide travel time estimates, determine traffic flow, notify users, generate other features, or a combination thereof.

The user data module 402 can update the activity history 412 based on the user cue 212, the user orientation 216, the target image vector 218, the external image 220, the potential targets, the target estimate 236, the image-address indicator 240, the sign-content estimate 246, or a combination thereof. The user data module 402 can update the activity history 412 for representing multiple instances of the user cue 212, the user orientation 216, the target image vector 218, the external image 220, the potential targets, the target estimate 236, the image-address indicator 240, the sign-content estimate 246, or a combination thereof over time, from multiple end-users, or a combination thereof. For example, the user data module 402 can update the activity history 412 based on storing the activity history 412 for representing multiple instances of the user cue 212, the user orientation 216, the target image vector 218, the external image 220, the potential targets, the target estimate 236, the image-address indicator 240, the sign-content estimate 246, or a combination thereof.

It has been discovered that the augmented output 248 based on the user orientation 216 and communicating visual information or the sign-content estimate 246 for the target estimate 236 to the system user 108 while operating or maneuvering the vehicle 202 provides increased usability and increased safety. The augmented output 248 generated based on determining the target estimate 236 using the target image vector 218 calculated using the user orientation 216. The navigation system 100 can map the user's gaze to the real-world or the space around the user with the target image vector 218 calculated using the user orientation 216. The augmented output 248 generated based on the target image vector 218 and the corresponding target estimate 236 can then communicate information that may be difficult for the driver or the passenger to view from within the vehicle 202. The communicated information can provide ease of use for information sought by the system user 108, and providing the added information can allow the user to focus on maneuvering the vehicle 202.

It has further been discovered that the sign-content estimate 246 within the external image 220 provides increased accuracy for the map information. The navigation system 100 can utilize the address information, operating information or hours, sign contents, names, contact information, or a combination thereof captured in various instances of the external image 220. The navigation system 100 can leverage crowd-sourced information within the various images to update and correct the map-entity detail 252 to improve and maintain current and accurate map data.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The modules can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The navigation system 100 has been described with module functions or order as an example. The navigation system 100 can partition the modules differently or order the modules differently. For example, the user data module 402, the map management module 404, the user monitor module 406, or a combination thereof can be implemented or executed in parallel. Also for example, the target analysis module 416 and the information analysis module 418 can be arranged, implemented, or executed differently as discussed above.

For illustrative purposes, the various modules have been described as being specific to the first device 102 or the second device 106. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the user image 214, the external image 220, or a combination thereof reflecting the system user 108, the real-world surrounding the user, or a combination thereof results in the movement in the physical world, such as physical change in the augmented output 248 communicated through one or more of the devices or physical displacement of the system user 108 carrying the first device 102. Movement in the physical world results in updates to the activity history 412, which can be fed back into the navigation system 100 and further influence or update the activity cluster 414, the predictive factor 234, further processing for the target estimate 236, or a combination thereof.

Figure 5:
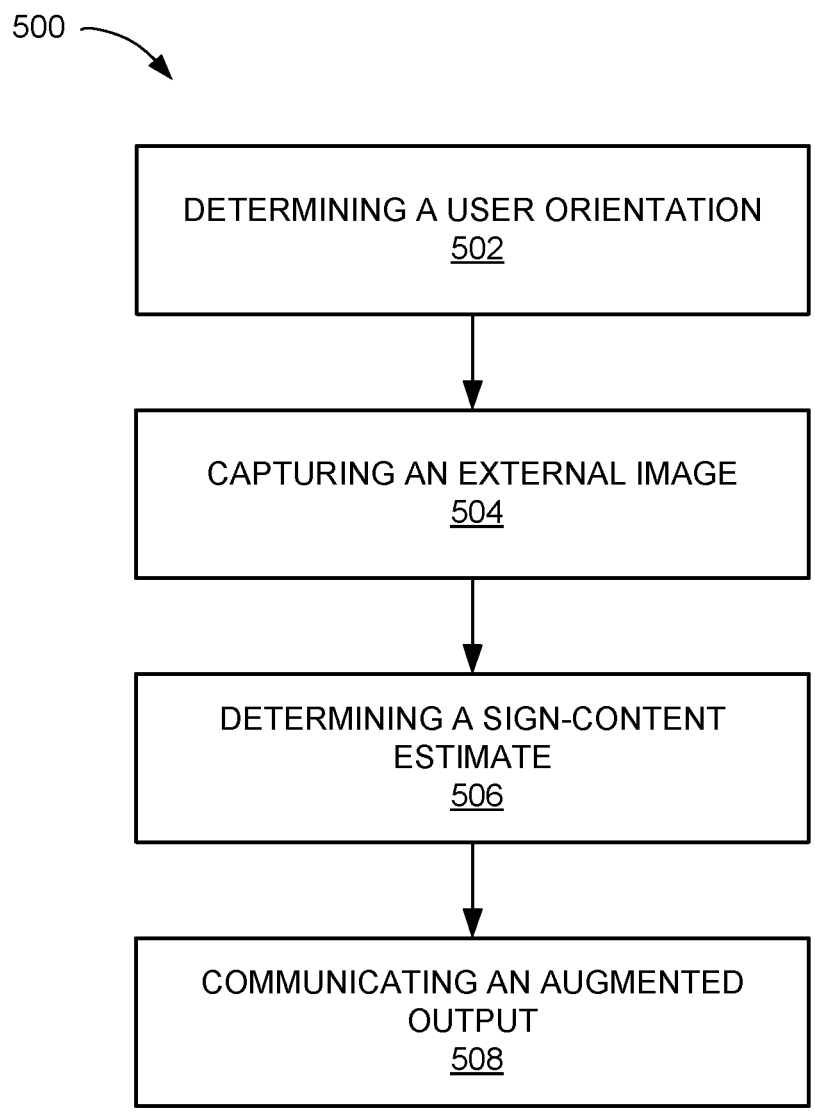
FIG. 5 is a flow chart of a method of operation of a navigation system in an embodiment of the present invention.

Referring now to FIG. 5, therein is shown a flow chart of a method 500 of operation of a navigation system 100 in an embodiment of the present invention. The method 500 includes: determining a user orientation for representing a system user in a block 502; capturing an external image based on the user orientation in a block 504; determining with a control circuit a sign-content estimate from the external image based on the user orientation in a block 506; and communicating an augmented output for representing a physical sign captured in the external image represented in a block 508.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
    determining, with a user monitor module, a user orientation for representing a system user;
    capturing, with an external imaging module, an external image based on the user orientation;
    determining, with an information analysis module, a sign-content estimate including an image-address indicator from the external image based on the user orientation;
    updating, with a user data module, an activity history based on the user orientation and the sign-content estimate with the activity history representing multiple instances of the user orientation and the sign-content estimate;
    identifying, with a map management module, an activity cluster based on the activity history with the activity cluster for representing a commonality in a current location, time, a contextual parameter, or a combination thereof across multiple instances of the user orientation and the sign-content estimate;
    updating, with a map management module, a map-entity detail based on the activity cluster corresponding to the image-address indicator, the map-entity detail for representing a map entity corresponding to the image-address indicator; and
    communicating, with a target communication module, an augmented output to a user for representing a physical sign captured in the external image.

2. The method as claimed in claim 1 wherein determining the user orientation includes:
    receiving a user image at a second device for receiving the user image captured and sent from a first device;
    calculating the user orientation from the user image;
    capturing the external image includes receiving the external image; and
    communicating the augmented output includes sending the augmented output for communicating the augmented output generated at the second device to the system user through the first device receiving the augmented output.

3. The method as claimed in claim 1 wherein:
    determining the user orientation includes calculating the user orientation at a device;
    capturing the external image includes controlling an image capturing circuit based on the user orientation; and
    communicating the augmented output includes communicating the augmented output for describing the physical sign to the system user using the device.

4. The method as claimed in claim 1 wherein determining the sign-content estimate includes:
    determining a target estimate from the external image based on the user orientation and a target recognition template for characterizing the physical sign; and
    determining the sign-content estimate from the target estimate within the external image.

5. The method as claimed in claim 1 further comprising:
    determining a current location for representing a device; and
    wherein:
        determining the sign-content estimate includes determining the sign-content estimate based on the current location.

6. The method as claimed in claim 1 further comprising calculating the user orientation from a user image based on physical markers of the system user in the user image.

7. The method as claimed in claim 1 further comprising determining a dynamic-delay estimate based on the external image and the activity cluster with the dynamic-delay estimate for representing an influence on a traffic flow rate.

8. The method as claimed in claim 1 further comprising calculating the user orientation based on a location or direction of the user's eyes, face, torso, arm, hand, fingers, or a combination thereof.

9. The method as claimed in claim 1 wherein determining the sign-content estimate includes:

determining a target estimate based on the user orientation and the activity cluster for representing multiple overlapping determinations of the sign-content estimate; and determining the sign-content estimate from the target estimate within the external image.

10. The method as claimed in claim 1 wherein:
capturing the external image includes capturing a directed image for representing the external image captured by an image capturing circuit aligned according to the user orientation;
updating the activity history includes updating the activity history based on the directed image.

11. A navigation system comprising:
a control circuit configured to:
   determine a user orientation for representing a system user,
   capture an external image based on the user orientation,
   determine a sign-content estimate including an image-address indicator from the external image based on the user orientation
   update an activity history based on the user orientation and the sign-content estimate with the activity history representing multiple instances of the user orientation and the sign-content estimate,
   identify an activity cluster based on the activity history with the activity cluster for representing a commonality in a current location, time, a contextual parameter, or a combination thereof across multiple instances of the user orientation and the sign-content estimate,
   update a map-entity detail based on the activity cluster corresponding to the image-address indicator, the map-entity detail for representing a map entity corresponding to the image-address indicator, and
an interface coupled to the control circuit, configured to communicate an augmented output to a user for representing a physical sign captured in the external image.

12. The system as claimed in claim 11 wherein:
the interface is configured to:
   receive a user image at a second device for receiving the user image captured and sent from a first device,
   receive the external image,
   send the augmented output for communicating the augmented output generated at the second device to the system user through the first device receiving the augmented output, and
the control circuit is configured to calculate the user orientation from the user image.

13. The system as claimed in claim 11 wherein:
the control circuit is configured to:
calculate the user orientation at a device,
control an image capturing circuit based on the user orientation, and
the interface is configured to communicate the augmented output for describing the physical sign to the system user using the device.

14. The system as claimed in claim 11 wherein the control circuit is configured to:
   determine a target estimate from the external image based on the user orientation and a target recognition template for characterizing the physical sign; and
   determine the sign-content estimate from the target estimate within the external image.

15. The system as claimed in claim 11 wherein the control circuit is configured to:
   determine a current location for representing a device; and determine the sign-content estimate based on the current location.

16. A non-transitory computer readable medium including instructions for a navigation system comprising:
   determining a user orientation for representing a system user;
   capturing an external image based on the user orientation;
   determining a sign-content estimate including an image-address indicator from the external image based on the user orientation
   updating an activity history based on the user orientation and the sign-content estimate with the activity history representing multiple instances of the user orientation and the sign-content estimate;
   identifying an activity cluster based on the activity history with the activity cluster for representing a commonality in a current location, time, a contextual parameter, or a combination thereof across multiple instances of the user orientation and the sign-content estimate;
   updating a map-entity detail based on the activity cluster corresponding to the image-address indicator, the map-entity detail for representing a map entity corresponding to the image-address indicator; and
   communicating an augmented output to a user for representing a physical sign captured in the external image.

17. The non-transitory computer readable medium including the instructions as claimed in claim 16 wherein determining the user orientation includes:
   receiving a user image at a second device for receiving the user image captured and sent from a first device;
   calculating the user orientation from the user image;
   capturing the external image includes receiving the external image; and
   communicating the augmented output includes sending the augmented output for communicating the augmented output generated at the second device to the system user through the first device receiving the augmented output.

18. The non-transitory computer readable medium including the instructions as claimed in claim 16 wherein:
   determining the user orientation includes calculating the user orientation at a device;
   capturing the external image includes controlling an image capturing circuit based on the user orientation; and
   communicating the augmented output includes communicating the augmented output for describing the physical sign to the system user using the device.

19. The non-transitory computer readable medium including the instructions as claimed in claim 16 wherein determining the sign-content estimate includes:
   determining a target estimate from the external image based on the user orientation and a target recognition template for characterizing the physical sign; and
   determining the sign-content estimate from the target estimate within the external image.

20. The non-transitory computer readable medium including the instructions as claimed in claim 16 further comprising:
   determining a current location for representing a device; and
wherein:
   determining the sign-content estimate includes determining the sign-content estimate based on the current location.

* * * * *